June 23, 1964
H. C. FLINT ETAL
3,138,373
SEAT CONSTRUCTION
Filed Feb. 24, 1961
5 Sheets-Sheet 5
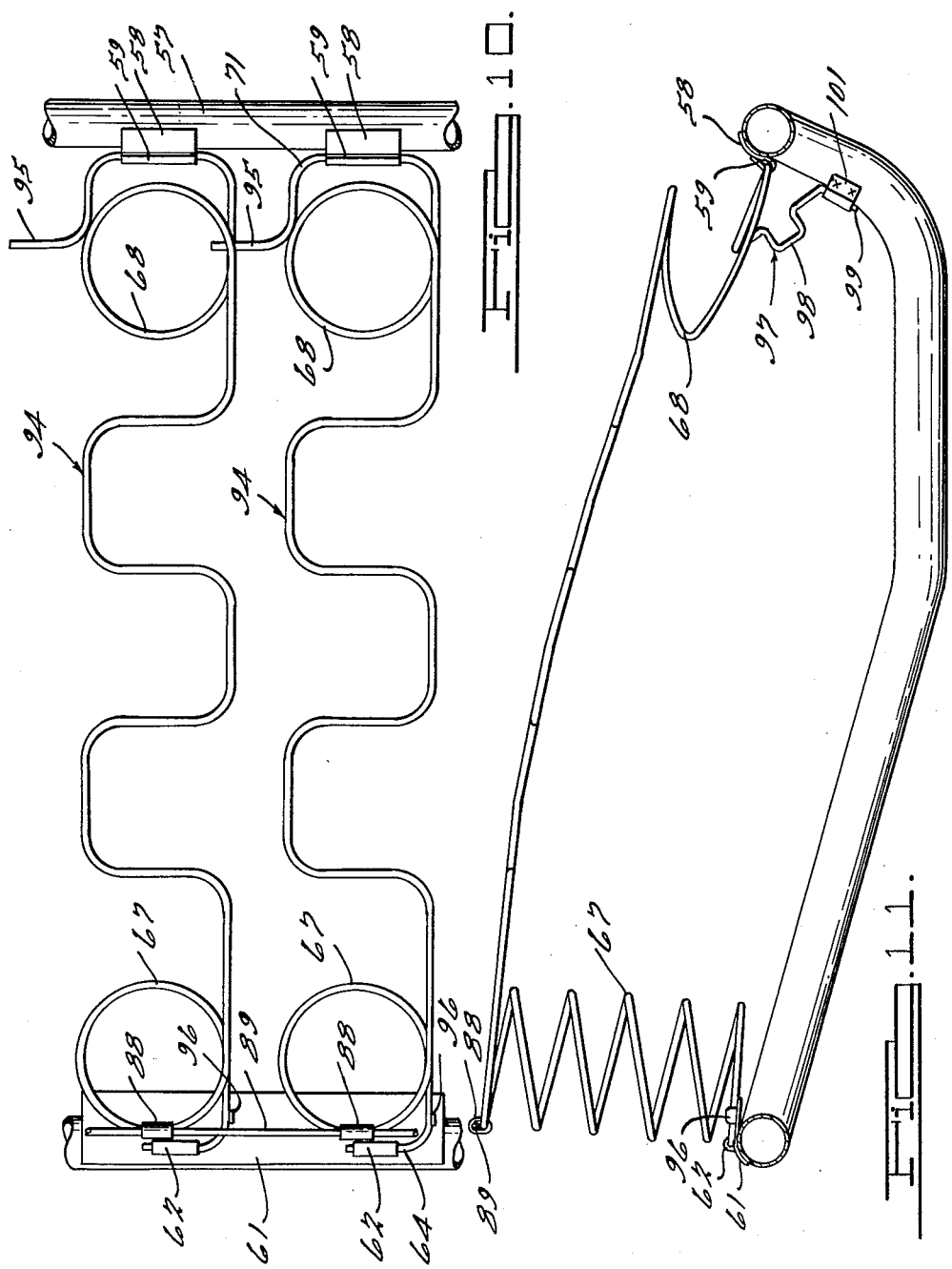
INVENTORS.
Hyland C. Flint
Robert K. McLean
BY
Harness, Dickey & Pierce
ATTORNEYS.

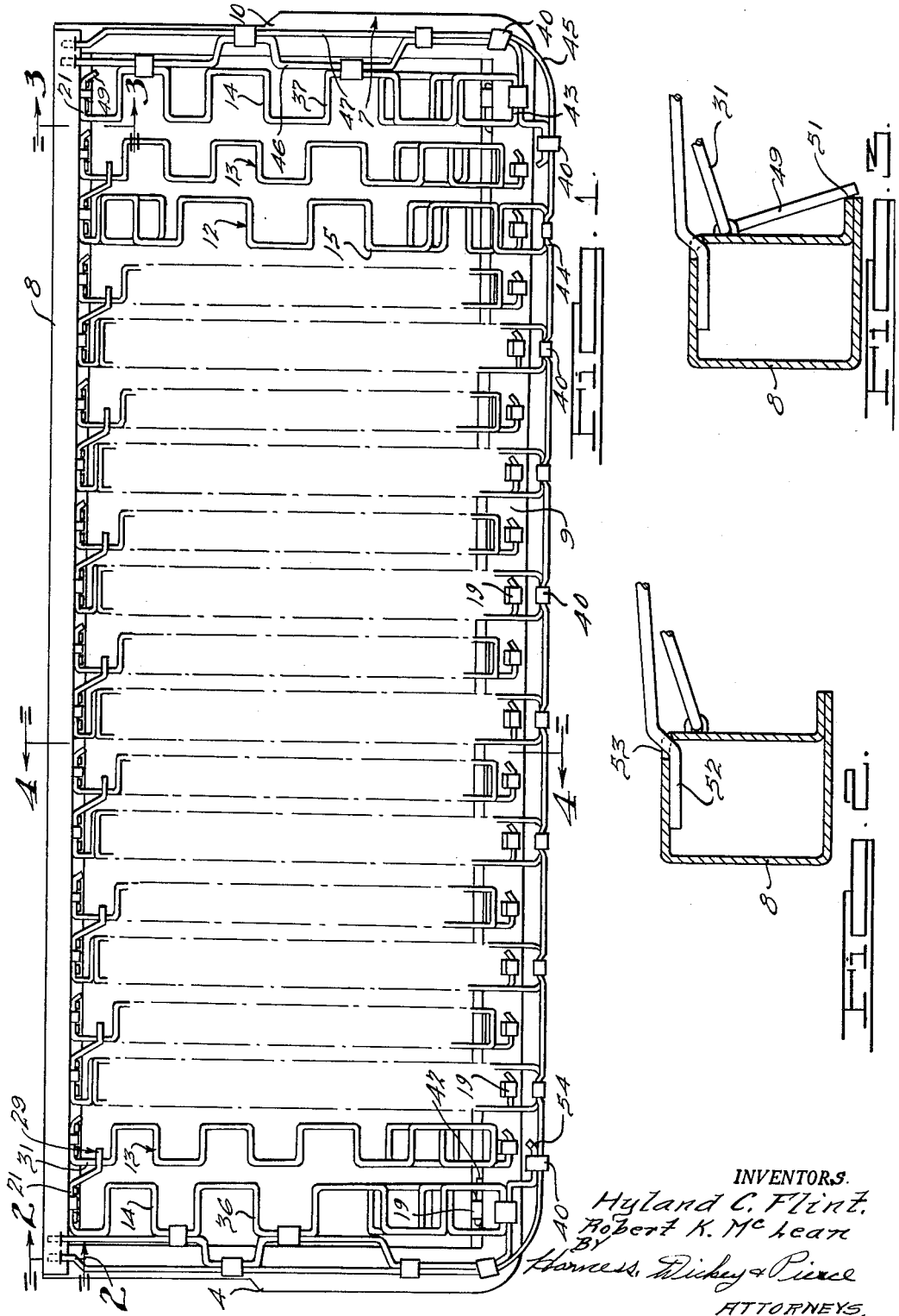

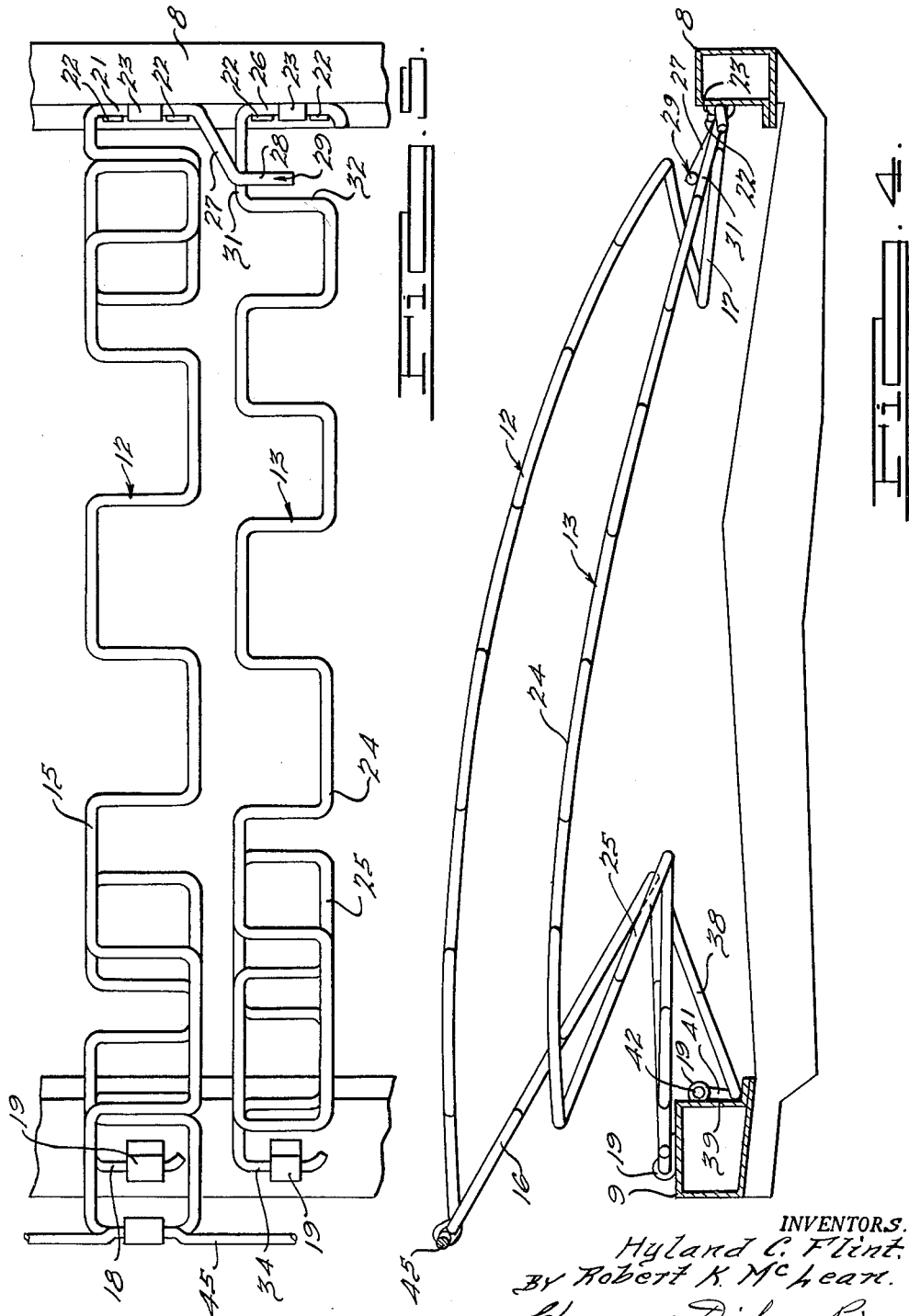

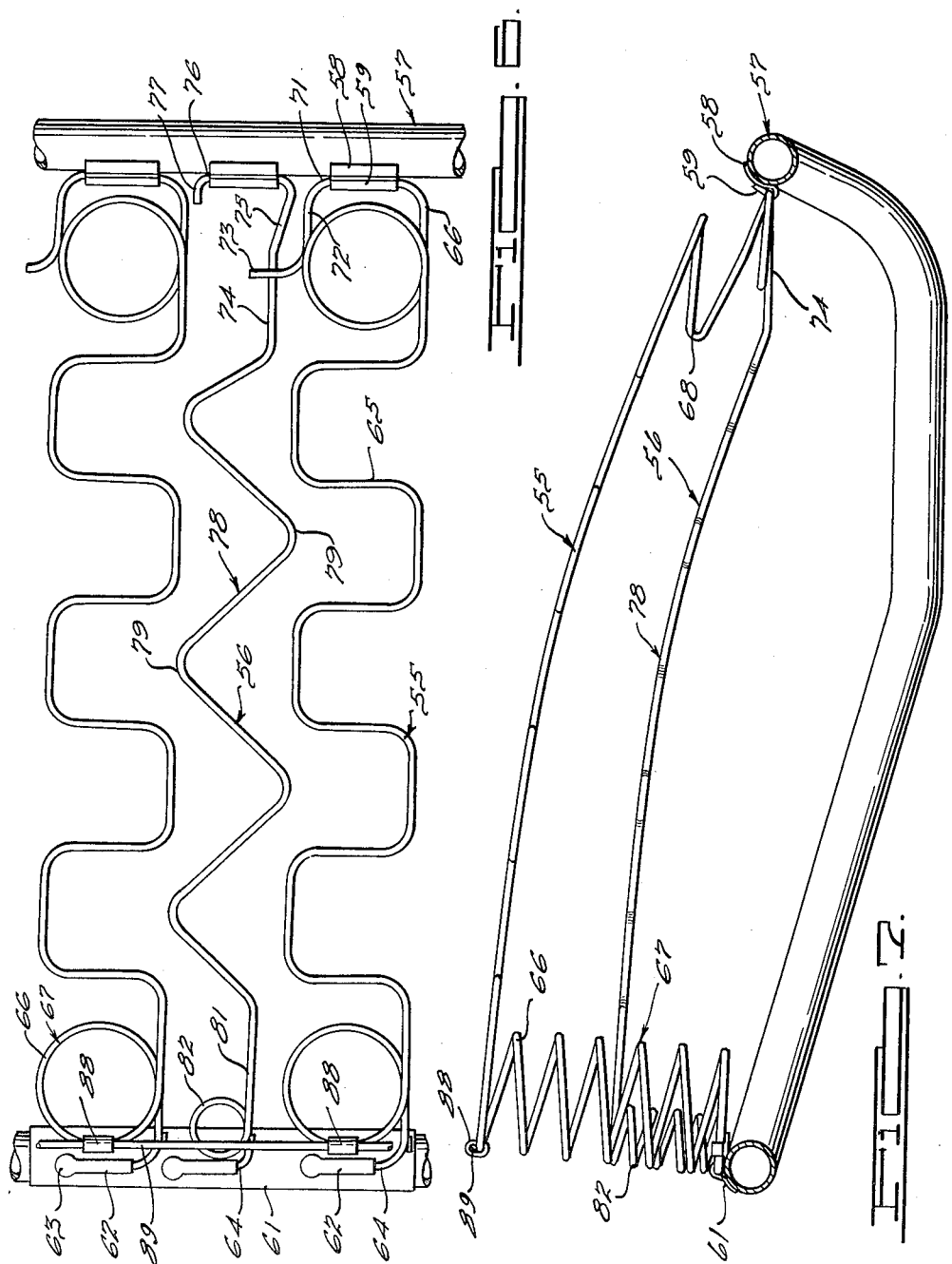

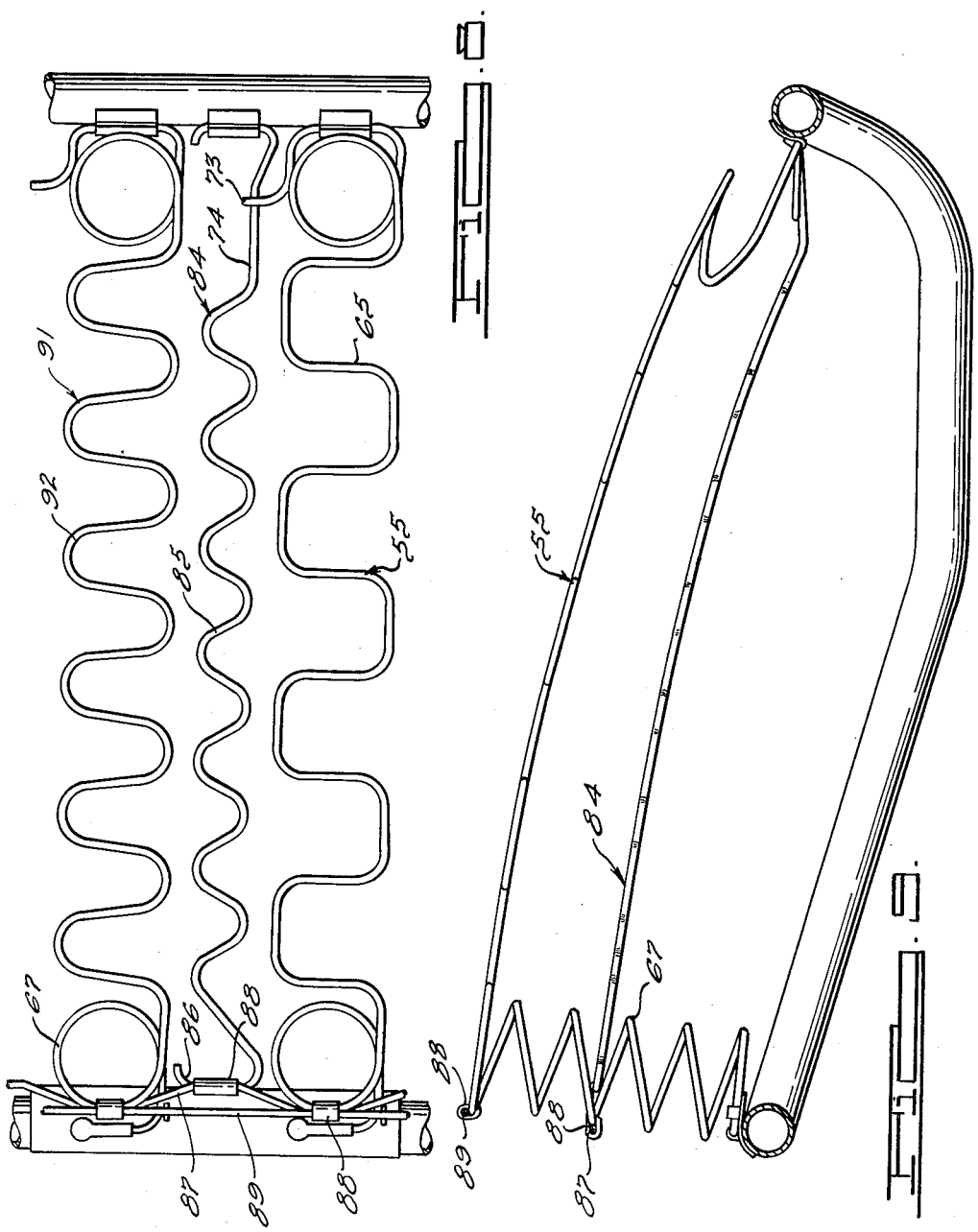

United States Patent Office 3,138,373
Patented June 23, 1964

3,138,373
SEAT CONSTRUCTION
Hyland C. Flint, Novi, and Robert K. McLean, Dearborn, Mich., assignors to American Metal Products Company, Detroit, Mich., a corporation of Michigan
Filed Feb. 24, 1961, Ser. No. 91,454
16 Claims. (Cl. 267—85)

This invention relates to spring cushions, and particularly to a spring cushion and to the spring units secured to the frame thereof.

In the application of H. C. Flint et al., Serial No. 4,455, filed January 25, 1960, now Patent No. 3,055,-653, September 25, 1962, for Spring Units and Cushion Constructed Therefrom, a new type of spring unit is illustrated embodying two formed wire spring sections which are joined together at the rear end. One of the spring sections has a V-shaped supporting portion at the front and rear ends and is higher than the other adjacent section which has a V-shaped supporting portion at the front end only. The sections are continuous, being joined together at the rear so as to have the load which is first applied to the higher spring section transferred to the lower spring section through the joined ends thereof. The load is transferred from one section to the other until the higher section is deflected sufficiently to be in the plane of the lower section which was deflected at a slower rate during the loading of the higher spring section, and thereafter both spring sections deflect together and directly support the load.

The special equipment heretofore developed for making the formed spring strips which had loops of different width to control the contour of the seating area when loaded was not of sufficient dimension to handle the lengths of wire required for forming the two spring sections. Rather than reconstruct, or redesign and construct, an entirely new machine, the sections of the unit spring of the present invention were made separate but where so interrelated as to produce a somewhat similar effect under load as that of the unit formed of the two joined spring sections of the application hereinabove referred to.

The present spring unit also comprises high and low spring sections disposed adjacent to each other. Instead of having the rear ends of the sections joined together, the two sections are separate, each having a transverse end which is pivotally secured to the rear element of the seat frame. The high spring section has the pivoted end extended forwardly and laterally to form a crank arm which extends over the web portion of the endmost loop of the lower adjacent spring section and is disposed in pressure engagement therewith. The loading of the high spring section is transferred by the crank arm to the low spring section, producing a similar preloading thereof and resistance to the deflection of the high spring section until the latter reaches the plane of the low spring section, after which both sections directly support the load and deflect in unison.

Accordingly, the main objects of the invention are: to provide a spring unit of independent high and low spring sections which are pivotally supported at the rear ends and are so constructed as to have the rear portion of the high section extend over in pressure engagement with the rear portion of the adjacent low section; to offer resistance to the pivoting of the end of one spring section relative to an adjacent spring section by providing a lateral extension to the end of the one section which engages an end of an adjacent spring section near the pivoted rear ends of the two sections; to provide a series of spring sections formed of wire to have the supporting front end portions retained by the front rail of a frame against downward pivotal movement, with alternate spring sections disposed higher than the spring sections therebetween and interconnected by a border wire which is above and out of engagement with the intermediate lower spring sections; and, in general, to form a cushion from a plurality of high and low independent spring sections which are preloaded through the engagement of rear end portions thereof, and which is simple in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken plan view of a spring cushion constructed from pairs of spring sections which embody features of the present invention;

FIG. 2 is an enlarged sectional view of the structure illustrated in FIG. 1, taken along the line 2—2 thereof;

FIG. 3 is an enlarged sectional view of the structure illustrated in FIG. 1, taken along the line 3—3 thereof;

FIG. 4 is an enlarged sectional view of the structure illustrated in FIG. 1, taken on the line 4—4 thereof;

FIG. 5 is a plan view of the structure illustrated in FIG. 4;

FIG. 6 is a plan view of structure, similar to that illustrated in FIG. 5, showing another form which the invention may assume;

FIG. 7 is a view in elevation of the structure illustrated in FIG. 6;

FIG. 8 is a view of structure, similar to that illustrated in FIG. 6, showing a still further form of the invention;

FIG. 9 is a view in elevation of the structure illustrated in FIG. 8;

FIG. 10 is a view of structure, similar to that illustrated in FIG. 8, showing another form of the invention; and FIG. 11 is a view in elevation of the structure illustrated in FIG. 10.

A cushion frame 7 has a rear rail 8, a front rail 9 and joining side rails 10 and 11. A plurality of pairs of formed spring sections 12 and 13 are secured to the front and rear rail elements to form the seating area of the resulting spring cushion. The endmost spring elements 14 are of somewhat different construction and may be of heavier gauge wire than the central sections to provide greater support at the side edges of the cushion. The section 12 is similar to the high section of the unit of the abovementioned application, having a load bearing top portion 15, a front V-shaped supporting portion 16 and a rear V-shaped supporting portion 17. The front transverse supporting end 18 of the V-shaped supporting portion 16 is secured in a tunnel-like element 19 which may be formed by a lanced-out finger from the top of the front rail element 9 and rolled into cylindrical shape, as illustrated. The rear transverse supporting end 21 is secured by upwardly extending fingers 22 and locked in position by a finger 23. The finger 23 is bent downwardly over the supporting end 21 of the spring strip after being disposed within the fingers 22. Adjacent to the high section 12 is the lower section 13 having a load bearing portion 24 and a small V-supporting front portion 25 which positions the load bearing portion 24 thereof below the load bearing portion 15 of the spring section 14, as clearly illustrated in FIG. 4. The V-shaped supporting portion 25 of the spring section 13 has a transverse end portion 34 which is secured to the top of the front rail element by the tunnel elements 19 thereof. The rear end of the load bearing portion 24 of the spring section 13 has a laterally extending end 26 which is supported by the fingers 22 and 23 of the rear frame element 8.

The transversely disposed end supporting portion 21 of the spring section 12 is extended forwardly at 27 and laterally at 28 to form a crank arm 29 which rests upon the side bar portion 31 of the spring section 13 to preload the sections. When a load is applied to the load bearing area 15 of the spring section 12, the transverse end securing portion 21 attempts to pivot in the supporting fingers 22 and 23, causing the crank arm portion 29 to bear downwardly on the side bar portion 31 of the section 13 and increase the pressure therebetween to provide increased resistance to deflection of the load bearing portion 15 of the strip 12 while deflecting the spring section. Pressure is exerted at all times between the crank arm 29 and the side bar portion 31 which preloads the load bearing portion 15 of the strip 12 and prevents it from sagging. This maintains the original contour to the pad and trim material applied over the spring sections 12 and 13.

The left-hand spring element 36 and the right-hand spring element 37 of the cushion illustrated in FIG. 1 have the front V-shaped supporting portion 16 disposed at a greater angle than that of the supporting portions of the spring section 12. This causes the forwardly directed bottom portion 38 thereof to engage the lower portion of the rear face 39 of the front rail 9. The end of the portion 38 has a vertically disposed U-shaped portion 41, the top transverse bar 42 of which extends within a tunnel 19 provided on the face 39 of the frame. This fixes the end of the V section 16 of the endmost spring elements against pivotal movement and locates the transverse bar 43 of the load bearing section 44 thereof rearwardly of that of the spring sections 12.

A border wire 45 is secured to the transverse bars 44 at the front end of the load bearing portions 15 of the spring section 12 and end spring elements 36 and 37 by bands 40. Portions 47 of the border wire extend rearwardly at the sides of the spring assembly, with the ends secured to the rear rail 8 of the frame 7. An arch or filler strip 46 is secured to the side portions 47 of the border wire 45 and to the endmost spring elements 36 and 37 by the bands 40. The spring strip 36 has a crank arm 29 provided on the transverse supporting end portion 21 thereof for resting upon the side bar portion 31 of the spring section 13 for resisting the pivoting movement of the end 21 and the deflection of the load bearing portion of the spring section 12. The spring strip 37 has the securing end 21 thereof extended downwardly at 49 in position to engage the flange extension 51 of the rear rail element 8. The rear ends of the border wire 45 and the filler strip 46 are offset downwardly at 52, as illustrated in FIG. 9, and extended through apertures 53 in the top rear corner of the front rail 9 of the frame. This securely anchors the rear ends of the filler strips and border wire to the frame. The front end portion 54 of the filler strips 46 is secured to the front section of the border wire by the bands 40, which is the same construction as illustrated in the above mentioned copending application.

Referring to FIGS. 6 and 7, a further form of the invention is illustrated, that wherein a high spring section 55 and a low spring section 56 form an operable unit. The units are illustrated as being mounted on a tubular frame 57 to the rear rail of which U-shaped clips 58 are welded. The front flange 59 of the clip receives the supporting end portion of the spring sections, after which the flange is crimped against the welded portion of the clip to lock the spring end to the frame. A strip 61 is welded or otherwise secured to the front tubular portion of the frame to extend across the entire length of the frame or made in sections, as illustrated in the figure, and secured at spaced points to the frame. Pressed-out U-shaped portions 62 are formed in the strip 61 having a bulbular end portion 63 to form a closed tunnel for the reception of the laterally disposed end 64 of the spring strips after grease or other lubricant has been placed therein for preventing any sounds and squeaks from being generated by the secured ends when the spring sections are occupied. The spring sections 55 form the high elements of the cushion, as clearly illustrated in FIG. 7. The load supporting portion of the spring section is formed of rectangular loop portions 65 which terminate at the forward end in circular turns 66 which form a supporting coil spring 67. A single turn 68 is provided at the rear end of the load supporting portion of the spring section which is extended rearwardly at 69, transversely at 71, forwardly at 72 and laterally at 73 to form a crank which extends over and engages the rearwardly extending portion 74 of the low spring section 56. The lower end of the coil spring 67 has the extending portion 64 disposed within the tunnel formed by the U-shaped embossment 62. The portion 71 at the rear of the spring element 55 is supported by the clip 58 in a manner above referred to. The spring section 56 has the rearward extended portion 74 bent outwardly at 75, laterally at 76 and forwardly at 77 to prevent the lateral portion 76 from moving from the clip after the flange 59 has been bent thereover. Forwardly of the portion 74 of the section 56, a zigzag portion 78 is provided, so related with the adjacent high spring element 55 as to have the apices 79 extend within the open sides of the loop 65 thereof, as clearly illustrated in FIG. 6. A straight portion 81 extends forwardly from the zigzag portion 78 and is formed into a short coil 82 of substantially less diameter than the coil 67 of the adjacent spring sections 55. The coil has the laterally extending end 64 by which it is secured within the formed inverted U-shaped portions 62 of the strip 61. The coil 67 can be preloaded by stressing it through the pull thereon provided when the lateral end 76 is secured in the clip 58. By lengthening or shortening the spring section 56, the preloading of the coil 67 is controlled. This regulates the eye level of the occupant and the degree of deflection of both spring sections.

The crank arm formed by the extension 73 which engages the portion 74 of the low spring section 56 transfers the load from the spring section 55 thereto. This causes the spring section 56 to deflect along with the spring section 55 but at a much slower rate until the load is sufficient to bring the spring sections into a common plane, after which both sections will directly support the load. After the load is removed from the unit, a force will still be applied between the crank end 73 of the spring section 55 and the engaged spring section 56 which will prevent the central part of the spring section 55 from sagging and thereby maintain a desired contour to the trim material applied thereover.

In FIGS. 8 and 9, a still further form of the invention is illustrated, that wherein the spring section 55 is exactly the same as that illustrated in FIGS. 6 and 7, while the spring section 84 provided in unit relation thereto has an end 74 which is engaged by the crank end 73 of the spring section 55, as illustrated in FIGS. 6 and 7. The forward extending load bearing portion 85 of the spring section 84 is of zigzag shape but of a substantially smaller width than the portion 78 of the spring section 56 of FIGS. 6 and 7. The forward end of the spring element 84 has a laterally extending portion 86 which is secured to an intermediate border wire 87 by a clip 88. The border wire 87 is secured to the coil spring portions 67 of the spring sections 55 by clips 88 interjacent the ends thereof. This supports the front end of the spring 84 on the lower half of the coil spring portions 67 of the spring sections 55. A border wire 89 is secured to the top turn of the spring portion 67 by bands 88. In the spring assemblies of FIGS. 6, 7, 8 and 9, the forward ends of the high spring section 55 are secured to the border wire 89 independent of the forward end of the elements 78 and 84 of the units.

It will be noted in FIG. 8 that in place of the spring section 55, a spring section 91 may be employed having the central load bearing area formed of smaller loops 92 than the loops 65 of the spring element 55. The smaller sinuous spring area 85 of the spring 84 could be widened and disposed in position to be in alignment with the loops 92 of the spring 91.

The spring sections of high and low construction which form the unit of the present invention function substantially in the same manner as the unit having the joined sections of the above mentioned copending application. This result is obtained by employing a crank arm or other lateral propection on the high spring section which has pressure relationship with the rear portion of the low spring section when in engagement therewith. This engagement provides stability to the high spring and will prevent it from sagging at the center so that it will maintain a desired contour to the padding and upholstery material when unoccupied. A predetermined force is present between the spring sections through the engagement of the crank arm, with the lower spring section 56 producing an upward force on the high spring section and a downward force on the adjacent low spring section of the unit. The upward force offers increased resistance to the deflection of the higher spring section.

The high and low spring sections are separate and entirely independent of each other except at the rear end where the crank arm of the high spring section rests upon a rear portion of the low spring section. A pressure engagement is provided between the sections which produces an upward force on the load bearing area of the high spring section to increase its resistance to deflection. The forward ends of the high spring sections are interconnected by a border wire, leaving the low spring sections therebetween unconnected at their forward ends.

A further form of the invention is illustrated in FIGS. 10 and 11 wherein like spring elements 94 are employed for constructing the spring cushion on the frame 57. The spring elements have the coil section 67 at the front end and the single turn 68 at the rear end, with the extending portion 64 of the coil 67 secured within the cylindrical clip 62. The extending portion is retained in the clip by the upstanding tongue 96 which intercepts the bottom turn when the coil section 67 is moved to vertical position. The rear end of the springs has the straight portions 71 supported in the clips 58 which are secured to the rear rail portion of a tubular frame 57. The end portion 71 is extended forwardly and laterally to form the crank arm portion 95 which engages the single turn 68 and bears thereon with a predetermined pressure to preload the spring element. The loops are less in number and of greater length and width, with the result that the spring element is wider than those employed in the structures described hereabove. Approximately twenty-one springs were mounted in the frame to provide this structure which extended across the width of the automobile body. Thirteen of the spring elements 94 will fill the same frame, thereby substantially reducing the amount of wire utilized to form the spring assembly.

The crank arms extend outwardly from the left side of the spring elements when viewed from the front end. As a result, all of the springs beginning with the one at the right-hand end will rest upon an adjacent spring element to the left thereof and be preloaded thereby through the connection of the crank arms therewith. This will occur to all of the spring elements except the one at the left-hand side of the frame when viewed from the front. The crank arm 95 of the left spring element must be resiliently supported to provide the same preloading as the other spring elements. An arm 97 is illustrated as being extended downwardly and rearwardly from the crank arm 95. The arm contains a loop 98 to provide resiliency thereto, and the end of the arm is angularly bent to form a securing end 99. The end extends within the cylindrical portion of the clip 101 which is welded or otherwise secured to the frame 57. The arm 97 will preload its spring element in the same manner as the crank arms 95 are loaded when resting on an adjacent spring so that all of the spring elements 94 will function in the same manner.

The front portions of the top turn of the coil sections 67 are joined to a border wire 89 by the bands 88 in the manner as hereinabove described. With this arrangement, all of the spring elements 94 except the one at the left-hand end of the series are exactly the same and are all of the same height. With the particular arrangement, a lesser number of the spring elements is required for the cushion. While the prestressed arms 97 could be employed on all of the spring elements, this would be more costly than employing the crank arms resting upon the adjacent springs. The preloading of the spring elements biases the load bearing central section upwardly and prevents a sagging appearance occurring to the pad and trim material applied on the top of the spring elements.

What is claimed is:

1. In a spring cushion construction, a frame having front and rear rail elements, spring units spanning said rails, each unit composed of two spring sections made of wire bent into sinuous form having front supporting ends of different height secured to the front rail element with the front of one section extending above the front of the other section, means on the rear ends of the spring sections by which they are pivotally secured to the rear rail element of the frame, and means on said spring sections provided with the higher front supporting end having a portion near the rear end which extends over and rests upon the lower spring section for transferring a load from the higher to said lower spring sections.

2. In a spring cushion construction, a frame having front and rear rail elements, spring units spanning said rails, each unit composed of two spring sections made of wire bent into sinuous form having front supporting ends of different height secured to the front rail element with the front of one section extending above the front of the other section, means on the rear ends of the spring sections by which they are pivotally secured to the rear rail element of the frame, and means on said spring sections provided with the higher front supporting end having a portion near the rear end which extends over and rests upon the lower spring section for transferring a load from the higher to said lower spring sections, the supporting portion of the endmost spring sections of the cushion being rigidly secured to the rear face of the front rail and the rear end of at least one of said endmost spring sections having laterally extending means in engagement with the adjacent spring section.

3. In a spring cushion construction, a frame having front and rear rail elements, spring units spanning said rails, each unit composed of two spring sections made of wire bent into sinuous form having front supporting ends of different height secured to the front rail element with the front of one section extending above the front of the other section, means on the rear ends of the spring sections by which they are pivotally secured to the rear rail element of the frame, and means on said spring sections provided with the higher front supporting end having a portion near the rear end which extends over and rests upon the lower spring section for transferring a load from the higher to said lower spring sections, the supporting portion of the endmost spring sections of the cushion being rigidly secured to the rear face of the front rail and the rear end of at least one of said endmost spring sections having laterally extending means in engagement with the adjacent spring section, the other of said endmost spring section having the pivoted end portion extended to engage the adjacent face of the rear rail to prevent the rotation thereof.

4. In a spring section, an upper load bearing seating portion, a coil of a plurality of turns forming a support for the front end of said portion, a coil of less numbers of turns at the rear end of said portion, and a rear pivotal attaching portion having a forwardly extending crank arm projecting laterally of the seating portion said crank arm being engageable with an adjacent spring element upon which it rests.

5. In a spring section, an upper load bearing seating portion, a coil of a plurality of turns forming a support for the front end of said portion, and a rear pivotal attaching portion having a forwardly extending crank arm projecting laterally of the seating portion said crank arm being engageable with an adjacent spring element upon which it rests.

6. In a spring section, a load bearing seating portion, a coil of a plurality of turns forming a support for the front of said portion, a laterally disposed attaching rear end portion, and a side bar portion in the load bearing seating portion extending forwardly from said rear end portion forming a support for the arm of an adjacent spring which rests thereon.

7. In a spring section, an upper load bearing seating portion of adjacent oppositely disposed loop formations, a coil of a plurality of turns forming a support for the front end of said portion, a coil of less numbers of turns at the rear end of said portion, and a rear pivotal attaching portion having a forwardly extending crank arm with the end disposed laterally of the seating portion said crank arm being engageable with an adjacent spring element upon which it rests.

8. In a spring section, an upper load bearing seating portion of adjacent oppositely disposed angular formations, a coil of a plurality of turns forming a support for the front end of said portion, and a rear pivotal attaching portion having a forwardly extending crank arm with the end disposed laterally of the seating portion said crank arm being engageable with an adjacent spring element upon which it rests.

9. A spring element having a central load bearing area of sinuous form, a supporting section below the front and rear ends of the load bearing section, the rear end having a lateral portion which forms a lever arm extending laterally of the load bearing area of the spring element, and a resilient portion on said lever arm which provides a support therefor said laterally extending portion being engageable with an adjacent spring element on which it rests.

10. A spring element made of wire having a longitudinally extending portion forming a load bearing area, a front and rear supporting end therefor, and a crank arm on the rear supporting end extending laterally of the load bearing area of the spring element said crank arm being engageable with an adjacent spring element upon which it rests.

11. A spring element made of wire having a longitudinally extending portion forming a load bearing area, a front and rear supporting end therefor, a crank arm on the rear supporting end extending laterally of the load bearing area of the spring element, and an extension of the wire forming the crank arm providing a resilient support therefor said crank arm being engageable with an adjacent spring element upon which it rests.

12. In a spring construction, a frame, a first spring element having a V-supporting front end portion secured to said frame, a second element section having a V-supporting front end portion secured to said frame, and a rear portion on at least one of said elements having a lateral extension which rests upon the rear portion of the adjacent spring element.

13. In a spring construction, a frame, a pair of spring elements made of wire bent back and forth into sinuous form to provide load bearing areas, said elements being secured to said frame, each of said load bearing areas having front supporting portions and rear securing portions, the rear securing portion of one spring element being extended and overlying the load bearing area of the other spring element so as to transmit the load of said one element to said other element.

14. In a spring construction, a plurality of pairs of interacting spring elements having load bearing areas and supporting ends, one element in each of said pairs of elements having a transverse end portion from which a crank arm projects in position to extend over and rest upon a portion of the load bearing area of the other element in each of said pairs of elements, said elements having crank arms being higher than said elements with which said crank arms engage, a frame on which said elements are secured, and a border wire connecting the front ends of said high spring elements.

15. In a spring construction a plurality of pairs of spring elements having load bearing areas, one of the elements in each of said pairs of elements having a transverse end portion from which an arm projects and extends over and rests upon a portion of the load bearing area of the other element of each of said pairs of elements, said one spring element of each pair of said elements being higher than the other element of each of said pairs of elements, the front end of each of said higher spring elements being formed downwardly into a coil spring of a plurality of turns to be disposed therebelow, a frame on which said elements are secured, a wire connected to intermediate turns of said coil springs of the higher elements of said pairs of elements, and a clip for securing the forward end of the lower elements of each of said pairs of elements to said wire.

16. In a spring section having a frame, first spring elements having upper load bearing seating portions of adjacent oppositely disposed loop formations, a coil of a plurality of turns forming a support for the front end of each of said elements and secured to said frame, a coil of less numbers of turns at the rear end of each of said elements and secured to said frame, a rear pivotal attaching portion having a forwardly extending crank arm with said end disposed laterally of said seating portion of each of said first spring elements, second spring elements disposed between said first spring elements and having load bearing seating portions of adjacent oppositely disposed angular formations, and an attaching end portion on each of said second spring elements with a portion forwardly thereof on which said crank arm of an adjacent first spring element rests.

References Cited in the file of this patent

UNITED STATES PATENTS

| | | |
|---|---|---|
| 2,285,827 | Neely | June 9, 1942 |
| 2,591,185 | Neely | Apr. 1, 1952 |
| 2,870,823 | Staples | Jan. 27, 1959 |
| 3,087,719 | Flint | Apr. 30, 1963 |
| 3,106,389 | Price | Oct. 8, 1963 |

FOREIGN PATENTS

| | | |
|---|---|---|
| 780,282 | Great Britain | July 31, 1957 |